(12) United States Patent
Okamoto et al.

(10) Patent No.: US 9,382,634 B2
(45) Date of Patent: Jul. 5, 2016

(54) METHOD FOR PREPARING LOW-MELTING-POINT PLATING SOLUTION FOR ALUMINUM ELECTROPLATING, PLATING SOLUTION FOR ALUMINUM ELECTROPLATING, METHOD FOR PRODUCING ALUMINUM FOIL, AND METHOD FOR LOWERING MELTING POINT OF PLATING SOLUTION FOR ALUMINUM ELECTROPLATING

(71) Applicant: HITACHI METALS, LTD., Tokyo (JP)

(72) Inventors: Atsushi Okamoto, Osaka (JP); Junichi Matsuda, Osaka (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 14/381,753

(22) PCT Filed: Feb. 27, 2013

(86) PCT No.: PCT/JP2013/055149
§ 371 (c)(1),
(2) Date: Aug. 28, 2014

(87) PCT Pub. No.: WO2013/129479
PCT Pub. Date: Sep. 6, 2013

(65) Prior Publication Data
US 2015/0068909 A1      Mar. 12, 2015

(30) Foreign Application Priority Data

Feb. 29, 2012   (JP) .................................. 2012-044378

(51) Int. Cl.
*C25D 3/44* (2006.01)
*C25D 3/66* (2006.01)
*C25D 1/04* (2006.01)
*H01G 11/68* (2013.01)
*H01G 11/84* (2013.01)
*H01M 4/66* (2006.01)
*H01M 10/0525* (2010.01)

(52) U.S. Cl.
CPC .. *C25D 3/44* (2013.01); *C25D 1/04* (2013.01); *C25D 3/665* (2013.01); *H01G 11/68* (2013.01); *H01G 11/84* (2013.01); *H01M 4/661* (2013.01); *H01M 10/0525* (2013.01); *Y02E 60/13* (2013.01); *Y02T 10/7011* (2013.01); *Y02T 10/7022* (2013.01)

(58) Field of Classification Search
CPC ........................................................ C25D 3/44
USPC ........................................................ 205/237
See application file for complete search history.

(56) References Cited

U.S. PATENT DOCUMENTS

2011/0253543 A1   10/2011   Hoshi et al.

FOREIGN PATENT DOCUMENTS

| JP | 2010-090414 A | 4/2010 |
| JP | 2010-232171 A1 | 10/2010 |
| WO | WO 2011/001932 A1 | 1/2011 |

OTHER PUBLICATIONS translation of JP 2010232171 of Okamoto et al. Published Oct. 14, 2010.*

(Continued)

*Primary Examiner* — Nicholas A Smith
*Assistant Examiner* — Brian W Cohen
(74) *Attorney, Agent, or Firm* — Kratz, Quintos & Hanson, LLP (57) ABSTRACT

An object of the present invention is to provide a method for preparing a plating solution for aluminum electroplating useful for the production of a high-ductility, high-purity aluminum foil at a high film formation rate, etc., which is an easy-to-handle plating solution that does not solidify and allows for an electroplating treatment even at 25° C. The present invention as a means for achieving the object is characterized in that in a preparation of a plating solution containing at least (1) a dialkyl sulfone, (2) an aluminum halide, and (3) a nitrogen-containing compound, the blending proportions of the dialkyl sulfone, the aluminum halide, and the nitrogen-containing compound are such that per 10 mol of the dialkyl sulfone, the aluminum halide is 3.5+n to 4.2+n mol, and the nitrogen-containing compound is n mol (wherein n is 0.001 to 2.0 mol). In addition, a plating solution for aluminum electroplating prepared by the method of the present invention allows for an electroplating treatment with high aluminum deposition efficiency relative to the current flow, and is thus advantageous in that electricity usage can be reduced, resulting in excellent economic efficiency.

6 Claims, 1 Drawing Sheet

(56) References Cited

OTHER PUBLICATIONS

International Search Report for International Application No. PCT/JP2013/055149 dated Jun. 4, 2013.
Extended European Search Report issued on Nov. 27, 2015 to the European patent application No. 13754132.2.
Extended European Search Report issued on Nov. 27, 2015 to the corresponding European patent application No. 137541322.
Joanna Maria Baecker: Übergangsmetalle in Ionischen Flüssigkeiten, Jan. 31, 2013, pp. 1-192, retrieved from the internat on Sep. 7, 2015.

* cited by examiner

METHOD FOR PREPARING LOW-MELTING-POINT PLATING SOLUTION FOR ALUMINUM ELECTROPLATING, PLATING SOLUTION FOR ALUMINUM ELECTROPLATING, METHOD FOR PRODUCING ALUMINUM FOIL, AND METHOD FOR LOWERING MELTING POINT OF PLATING SOLUTION FOR ALUMINUM ELECTROPLATING

TECHNICAL FIELD

The present invention relates to a method for preparing a low-melting-point plating solution for aluminum electroplating which can be suitably used, for example, for the production of an aluminum foil by electrolysis, which can be used, for example, as a positive electrode current collector for electrical storage devices such as lithium ion secondary batteries and supercapacitors (electrical double-layer capacitors, redox capacitors, lithium ion capacitors, etc.), a plating solution for aluminum electroplating, a method for producing an aluminum foil, and a method for lowering a melting point of a plating solution for aluminum electroplating.

BACKGROUND ART

It is a well-known fact that lithium ion secondary batteries, which have high energy density and whose discharge capacity does not significantly decrease, have been used for a power source for mobile tools such as mobile phones and laptop computers. In recent years, with the miniaturization of mobile tools, there also is a demand for the miniaturization of lithium ion secondary batteries to be mounted therein. In addition, with the development of hybrid cars, solar power generation, and other technologies as a measure to prevent global warming, etc., the application of supercapacitors having high energy density, such as electrical double-layer capacitors, redox capacitors, and lithium ion capacitors, has been increasingly expanding, and there is a demand for a further increase in their energy density.

An electrical storage device, such as the lithium ion secondary battery or the supercapacitor, has a structure in which, for example, a positive electrode, a negative electrode, and a separator made of a polyolefin or the like between them are arranged in an organic electrolytic solution containing a fluorine-containing compound, such as $LiPF_6$ or $NR_4.BF_4$ (R is an alkyl group), as an electrolyte. Generally, the positive electrode includes a positive electrode active material, such as $LiCoO_2$ (lithium cobalt oxide) or active carbon, and a positive electrode current collector, while the negative electrode includes a negative electrode active material, such as graphite or active carbon, and a negative electrode current collector, and, with respect to the shape, the electrodes are each obtained by applying the active material to the surface of the current collector and forming the same into a sheet. The electrodes are each subjected to high voltage and also immersed in the highly corrosive organic electrolytic solution that contains a fluorine-containing compound. Accordingly, materials for the positive electrode current collector, in particular, are required to have excellent electrical conductivity together with excellent corrosion resistance. Under such circumstances, currently, aluminum, which is a good electrical conductor and forms a passive film on the surface to offer excellent corrosion resistance, is almost 100% used as the material for a positive electrode current collector. Incidentally, as materials for the negative electrode current collector, copper, nickel, or the like can be mentioned.

One method for achieving the miniaturization and higher energy density of an electrical storage device is to thin a current collector that constitutes a sheet-shaped electrode. Currently, an aluminum, foil having a thickness of about 15 to 20 μm produced by rolling is commonly used as a positive electrode current collector. Therefore, the object can be achieved by further reducing the thickness of such an aluminum foil. However, in rolling, it is difficult to further reduce foil thickness on an industrial production scale.

Then, a possible aluminum foil production method to replace rolling is a method for producing an aluminum, foil by electrolysis. The production of a metal foil by electrolysis is performed, for example, by forming a metal film on a surface of a substrate such as a stainless steel plate by electroplating, followed by the removal of the film from the substrate. Such production is well known as a method for producing a copper foil, for example. However, aluminum is an electrochemically base metal, and thus electroplating is extremely difficult. Therefore, it is not easy to produce an aluminum foil by electrolysis. Patent Document 1 discloses, as a method for producing an aluminum foil by electrolysis, a method that uses an electrolytic bath containing 50 to 75 mol % of aluminum chloride and 25 to 50 mol % of an alkylpyridinium chloride or an electrolytic bath prepared by adding an organic solvent to such a bath. However, in this method, the chlorine concentration in a plating solution is extremely high. This leads to a problem in that during a plating treatment, chlorine contained in the plating solution reacts with moisture in the air to generate hydrogen chloride gas, causing the corrosion of equipment. Therefore, it is necessary to take a measure to prevent the generation of hydrogen chloride gas or a measure to protect equipment from corrosion due to the generated hydrogen chloride gas. Further, the method described in Patent Document 1 also has a problem in that the applicable current, density is about 2 $A/dm^2$ maximum, and thus the film formation rate is low (when the applied current density is increased any further, the plating solution decomposes, etc., making it impossible to stably perform a plating treatment). The addition of an organic solvent, such as benzene or toluene, to the plating solution is expected to improve the film formation rate. However, these organic solvents have high toxicity and are dangerous because of high inflammability, and, therefore, it must be said that the addition of such organic solvents to a plating solution is problematic in terms of the ease of liquid waste disposal and safety.

In light of the above points, the research group of the present inventors has been vigorously conducting research on a method for producing a high-ductility, high-purity aluminum foil at a high film formation rate by electrolysis using a plating solution having a low chlorine concentration. As a result, in Patent Document 2, they have proposed a method in which an aluminum film is formed on a surface of a substrate by electrolysis using a plating solution containing at least (1) a dialkyl sulfone, (2) an aluminum halide, and (3) at least one nitrogen-containing compound selected from the group consisting of an ammonium halide, a hydrogen halide salt of a primary amine, a hydrogen halide salt of a secondary amine, a hydrogen halide salt of a tertiary amine, and a quaternary ammonium salt represented by the general formula; $R^1R^2R^3R^4N.X$ ($R^1$ to $R^4$ independently represent an alkyl group and are the same as or different from one another, and X represents a counteranion for the quaternary ammonium cation), and then the film is removed from the substrate. According to Patent Document 2, the blending proportions of the dialkyl sulfone, the aluminum halide, and the nitrogen-containing compound in the plating solution for aluminum electroplating are such that per 10 mol of the dialkyl sulfone, the aluminum halide is preferably 1.5 to 4.0 mol, and the nitrogen-containing compound is preferably 0.01 to 2.0 mol. The plating solution of such blending proportions is useful for the production of a high-ductility, high-purity aluminum foil at a high film formation rate, etc. However, there remains room for improvement in terms of ease of handling, etc. Specifically, the plating solution of such blending proportions has the following issues. Because a dialkyl sulfone, which is used as a solvent component, has a high melting point (e.g., the melting point of dimethyl sulfone is about 110° C.), when an electroplating treatment is performed, unless the temperature of the plating solution is equal to or higher than the melting point of the dialkyl sulfone, the plating solution solidifies, making it impossible to perform the treatment. Further, because the plating solution is solid at a normal temperature of 25° C., the plating solution cannot be easily and smoothly prepared, disposed, etc. Therefore, there has been a demand for a method for lowering the melting point of the plating solution without significantly changing the blending proportions thereof.

In Patent Document 3 proposed by the research group of the present inventors, which relates to a method for lowering a melting point of a plating solution for aluminum electroplating, it is stated that in the case of a plating solution for aluminum electroplating containing a dialkyl sulfone and an aluminum halide, when the blending proportions of the two are such that the aluminum halide is 4 mol per 10 mol of the dialkyl sulfone, the melting point is lowered, allowing for an electroplating treatment even at 60° C. However, the plating solution described in Patent Document 3 does not contain the nitrogen-containing compound described in Patent Document 2. Regarding whether the melting point can always be lowered also in a plating solution containing the nitrogen-containing compound described in Patent Document 2 when the blending proportions of the dialkyl sulfone and the aluminum halide are such that the latter is 4 mol per 10 mol of the former, the study by the present inventors has revealed that it is not always possible.

PRIOR ART DOCUMENTS

Patent Documents

Patent Document 1: JP-A-1-104791
Patent Document 2: WO 2011/001932
Patent Document 3: Japanese Patent 4603777

SUMMARY OF THE INVENTION

Problems that the Invention is to Solve

Thus, an object of the present invention is to provide a method for preparing a plating solution for aluminum electroplating useful for the production of a high-ductility, high-purity aluminum foil at a high film formation rate, etc., which is an easy-to-handle plating solution that does not solidify and allows for an electroplating treatment even at 25° C.; a plating solution for aluminum electroplating prepared by the method; a method for producing an aluminum foil using the plating solution for aluminum electroplating; and a method for lowering a melting point of a plating solution for aluminum electroplating.

Means for Solving the Problems

In light of the above points, the present inventors have conducted extensive research. As a result, they have found that in a preparation of a plating solution for aluminum electroplating containing a dialkyl sulfone, an aluminum halide, and a nitrogen-containing compound, in the case where the blending proportions of the aluminum halide and the nitrogen-containing compound relative to the dialkyl sulfone are in the predetermined relation where the former blending proportion depends on the latter blending proportion, the resulting plating solution has a low melting point, and it does not solidify and is fluid even at 25° C.

A method for preparing a plating solution for aluminum electroplating of the present invention accomplished based on the above findings is, as defined in claim 1, a method for preparing a plating solution for aluminum electroplating containing at least (1) a dialkyl sulfone, (2) an aluminum halide, and (3) a nitrogen-containing compound, characterized in that the blending proportions of the dialkyl sulfone, the aluminum halide, and the nitrogen-containing compound in a preparation of a plating solution are such that per 10 mol of the dialkyl sulfone, the aluminum halide is 3.5+n to 4.2+n mol, and the nitrogen-containing compound is n mol (wherein n is 0.001 to 2.0 mol), thereby providing the plating solution with a melting point of 25° C. or less.

A method for preparing a plating solution for aluminum electroplating as defined in claim 2 is characterized in that in the method for preparing a plating solution for aluminum electroplating according to claim 1, the dialkyl sulfone is dimethyl sulfone.

A method for preparing a plating solution for aluminum electroplating as defined in claim 3 is characterized in that in the method for preparing a plating solution for aluminum electroplating according to claim 1, the nitrogen-containing compound is at least one selected from the group consisting of an ammonium halide, a hydrogen halide salt of a primary amine, a hydrogen halide salt of a secondary amine, a hydrogen halide salt of a tertiary amine, a quaternary ammonium salt represented by the general formula: $R^1R^2R^3R^4N.X$ ($R^1$ to $R^4$ independently represent an alkyl group and are the same as or different from one another, and X represents a counteranion for the quaternary ammonium cation), and a nitrogen-containing aromatic compound.

A plating solution for aluminum electroplating of the present invention is, as defined in claim 4, characterized by being prepared by the preparation method of claim 1.

A method for producing an aluminum foil of the present invention is, as defined in claim 5, characterized in that an aluminum film is formed on a surface of a substrate by electrolysis using the plating solution for aluminum electroplating of claim 4, and then the film is removed from the substrate.

A method for lowering a melting point of a plating solution for aluminum electroplating of the present invention is, as defined in claim 6, characterized in that in a preparation of a plating solution for aluminum electroplating containing at least (1) a dialkyl sulfone, (2) an aluminum halide, and (3) a nitrogen-containing compound, the blending proportions of the dialkyl sulfone, the aluminum halide, and the nitrogen-containing compound are such that per 10 mol of the dialkyl sulfone, the aluminum halide is 3.5+n to 4.2+n mol, and the nitrogen-containing compound is n mol (wherein n is 0.001 to 2.0 mol).

Effect of the Invention

The present invention enables the provision of a method for preparing a plating solution for aluminum electroplating useful for the production of a high-ductility, high-purity aluminum foil at a high film formation rate, etc., which is an easy-to-handle plating solution that does not solidify and allows for an electroplating treatment even at 25° C.; a plating solution for aluminum electroplating prepared by the method; a method for producing an aluminum foil using the plating solution for aluminum electroplating; and a method for lowering a melting point of a plating solution for aluminum electroplating. In addition, a plating solution for aluminum electroplating prepared by the method of the present invention allows for an electroplating treatment with high aluminum deposition efficiency relative to the current flow, and is thus advantageous in that electricity usage can be reduced, resulting in excellent economic efficiency.

MODE FOR CARRYING OUT THE INVENTION

The method for preparing a plating solution for aluminum electroplating of the present invention is a method for preparing a plating solution for aluminum electroplating containing at least (1) a dialkyl sulfone, (2) an aluminum halide, and (3) a nitrogen-containing compound, characterized in that the blending proportions of the dialkyl sulfone, the aluminum halide, and the nitrogen-containing compound in a preparation of a plating solution are such that per 10 mol of the dialkyl sulfone, the aluminum halide is 3.5+n to 4.2+n mol, and the nitrogen-containing compound is n mol (wherein n is 0.001 to 2.0 mol), thereby providing the plating solution with a melting point of 25° C. or less. According to the method of the present invention, without the blending proportions of the components of a plating solution for aluminum electroplating being significantly changed from the preferred blending proportions defined in Patent Document 2, a low-melting-point plating solution that does not solidify and is fluid even at 25° C. can be prepared. Particularly, the blending proportion of the nitrogen-containing compound relative to the dialkyl sulfone, which contributes to the improvement of the film formation rate owing to the realization of a plating treatment at a high applied current density based on the improvement of the electrical conductivity of the plating solution, the purity increase or ductility improvement in the aluminum film, etc., is not changed from the preferred blending proportion defined in Patent Document 2. Therefore, the plating solution prepared by the method of the present invention is useful for the production of a high-ductility, high-purity aluminum foil at a high film formation rate, etc. In addition, the plating solution prepared by the method of the present invention allows for an electroplating treatment with high aluminum deposition efficiency relative to the current flow, and is thus advantageous in that electricity usage can be reduced, resulting in excellent economic efficiency.

The reason why a low-melting-point plating solution that does not solidify and is fluid even at 25° C. is obtained in the case where the blending proportions of the aluminum halide and the nitrogen-containing compound relative to the dialkyl sulfone in a preparation of a plating solution are in the above relation where the former blending proportion depends on the latter blending proportion is not necessarily clear, but the present inventors currently speculate as follows. As described in Patent Document 3, in the case where the blending proportion of the aluminum halide per 10 mol of the dialkyl sulfone is 4 mol, the melting point of the plating solution is lowered. This is presumably attributable to that when the blending proportion of the aluminum halide relative to the dialkyl sulfone is near this value, the proportion of a dialkyl sulfone that coordinates with aluminum ions in the plating solution to form complexes is high, while the proportion of an uncomplexed free dialkyl sulfone is low. When a nitrogen-containing compound is blended here, the proportion of the dialkyl sulfone that coordinates with aluminum ions to form complexes decreases, whereby the proportion of the uncomplexed free dialkyl sulfone increases. However, when an aluminum halide is additionally blended in an amount corresponding to the number of moles of the nitrogen-containing compound blended, the proportion of the dialkyl sulfone that coordinates with aluminum ions to form complexes increases, whereby the proportion of the uncomplexed free dialkyl sulfone decreases. This presumably results in the lowering of the melting point of the plating solution.

Examples of the dialkyl sulfone to be contained in the plating solution for aluminum electroplating prepared by the method of the present invention include those having a $C_{1-6}$ alkyl group (straight or branched), such as dimethyl sulfone, diethyl sulfone, dipropyl sulfone, dihexyl sulfone, and methylethyl sulfone. In terms of excellent electrical conductivity, availability, and the like, it is preferable to use dimethyl sulfone.

Examples of the aluminum halide include aluminum chloride and aluminum bromide. In terms of minimizing the content of water in the plating solution, which is a factor that inhibits the deposition of aluminum, it is preferable that the aluminum halide used is an anhydride.

The nitrogen-containing compound means a compound having at least one nitrogen atom in one molecule. Suitable examples of an usable nitrogen-containing compound include an ammonium halide, a hydrogen halide salt of a primary amine, a hydrogen halide salt of a secondary amine, a hydrogen halide salt of a tertiary amine, a quaternary ammonium salt represented by the general formula: $R^1R^2R^3R^4N.X$ ($R^1$ to $R^4$ independently represent an alkyl group and are the same as or different from one another, and X represents a counteranion for the quaternary ammonium cation), and a nitrogen-containing aromatic compound. These nitrogen-containing compounds may be used alone or as a mixture of two or more thereof.

Examples of the ammonium halide usable as the nitrogen-containing compound include ammonium chloride and ammonium bromide. In addition, examples of the primary to tertiary amines include those having a $C_{1-6}$ alkyl group (straight or branched), such as methylamine, dimethylamine, trimethylamine, ethylamine, diethylamine, triethylamine, propylamine, dipropylamine, tripropylamine, hexylamine, and methylethylamine. Examples of the hydrogen halide include hydrogen chloride and hydrogen bromide. Examples of the alkyl group represented by $R^1$ to $R^4$ in the quaternary ammonium salt represented by the general formula: $R^1R^2R^3R^4N.X$ ($R^1$ to $R^4$ independently represent an alkyl group and are the same as or different from one another, and X represents a counteranion for the quaternary ammonium cation) include $C_{1-6}$ alkyl groups (straight or branched), such as a methyl group, an ethyl group, a propyl group, and a hexyl group. Examples of X include halide ions such as a chlorine ion, a bromine ion, and an iodine ion, as well as $BF_4^-$, $PF_6^-$, and the like. Specific examples of the compound include tetramethylammonium chloride, tetramethylammonium bromide, tetramethylammonium iodide, and tetraethylammonium tetrafluoroborate. Examples of the nitrogen-containing aromatic compound include phenanthroline. In terms of facilitating the formation of a high-ductility, high-purity aluminum film at a high film formation rate, preferred examples of the nitrogen-containing compound include hydrochlorides of tertiary amines, such as trimethylamine hydrochloride.

In the plating solution for aluminum electroplating prepared by the method of the present invention, the blending proportions of the dialkyl sulfone, the aluminum halide, and the nitrogen-containing compound are such that per 10 mol of the dialkyl sulfone, the aluminum halide is 3.5+n to 4.2+n mol, and the nitrogen-containing compound is n mol (wherein n is 0.001 to 2.0 mol). What is important in the present invention is that the blending proportion of the aluminum halide relative to the dialkyl sulfone depends on the blending proportion of the nitrogen-containing compound relative to the dialkyl sulfone. When these components are mixed in blending proportions that satisfy the above relation to prepare a plating solution, a low-melting-point plating solution that does not solidify and is fluid even at 25° C. can be obtained. In addition, the plating solution prepared by the method of the present invention allows for an electroplating treatment with high aluminum deposition efficiency relative to the current flow, and is thus advantageous in that electricity usage can be reduced, resulting in excellent economic efficiency. Incidentally, it is preferable that the plating solution is prepared by heating a mixture of these components in a nitrogen gas or inert gas atmosphere to the melting point of the dialkyl sulfone, and dissolving the aluminum halide and the nitrogen-containing compound in the molten dialkyl sulfone. The reason why the blending proportion of the nitrogen-containing compound relative to the dialkyl sulfone should be 0.001 to 2.0 mol per 10 mol of the dialkyl sulfone is that when the blending proportion is below 0.001 mol, it may be difficult to obtain the effects of blending, that is, effects such as the improvement of the film formation rate owing to the realization of a plating treatment at a high applied current density based on the improvement of the electrical conductivity of the plating solution, the purity increase or ductility improvement in the aluminum film, etc., while when it is more than 2.0 mol, aluminum may not be deposited due to fundamental changes in the composition of the plating solution. The blending proportion of the nitrogen-containing compound relative to the dialkyl sulfone is preferably 0.05 to 1.5 mol per 10 mol of the dialkyl sulfone. The reason why the blending proportion of the aluminum halide relative to the dialkyl sulfone should be 3.5+n to 4.2+n mol depending on the blending proportion of the nitrogen-containing compound n mol per 10 mol of the dialkyl sulfone is that when the blending proportion is below 3.5+n mol or more than 4.2+n mol, the melting point of the plating solution may not be lowed, or the aluminum deposition efficiency relative to the current flow may decrease. In addition, when the blending proportion of the aluminum halide relative to the dialkyl sulfone is too low, this may cause the darkening of the aluminum film formed (a phenomenon called burning) or reduce the film formation efficiency. Meanwhile, when it is too high, the solution resistance of the resulting plating solution may be so high that the plating solution may generate heat and decompose. The blending proportion of the aluminum halide relative to the dialkyl sulfone is preferably 3.8+n to 4.0+n mol per 10 mol of the dialkyl sulfone.

In the case where an aluminum foil is produced using the plating solution for aluminum electroplating prepared by the method of the present invention, it may be produced by forming an aluminum film on a surface of a substrate by electrolysis, followed by the removal of the film from the substrate. The plating solution prepared by the method of the present invention has a low melting point, and it does not solidify and is fluid even at 25° C. Accordingly, an electroplating treatment can be performed even when the temperature of the plating solution is 25° C. In the case where an electroplating treatment is performed with the temperature of the plating solution being 25 to 80° C., for example, the applied current density is preferably 2 to 15 A/dm$^2$. When the applied current density is below 2 A/dm$^2$, the film formation efficiency may decrease. Meanwhile, when it is more than 15 A/dm$^2$, because of the decomposition of the nitrogen-containing compound, etc., it may be impossible to perform a stable plating treatment or obtain a high-ductility, high-purity aluminum foil. The applied current density is more preferably 3 to 12 A/dm$^2$. The plating solution prepared by the method of the present invention can also be used for an electroplating treatment by being heated to a temperature of more than 80° C. When the temperature of the plating solution is raised, the viscosity of the plating solution decreases, whereby the electrical conductivity is improved. In the case where the plating solution prepared by the method of the present invention is heated to a temperature of more than 80° C., a current density of more than 15 A/dm$^2$ can be applied, allowing for an efficient electroplating treatment (the upper limit of the applied current density is 60 A/dm$^2$, for example). Incidentally, the upper limit of the temperature of the plating solution when used for an electroplating treatment is 150° C., for example. When the temperature of the plating solution is more than 150° C., non-negligible evaporation of the plating solution may take place, resulting in changes in the composition. This may also accelerate the reaction between an aluminum film formed on the surface of the substrate and the plating solution, which may lead to the incorporation of more impurities into the aluminum film, thereby reducing its purity. The electroplating treatment time depends on the desired thickness of the aluminum foil, the temperature of the plating solution, the applied current density, etc., but is usually 0.5 to 90 minutes. In terms of preventing the deterioration of the plating solution to extend the life, it is preferable that the electroplating treatment environment is of a dry atmosphere.

As the substrate for forming an aluminum film (cathode), a stainless steel plate, a titanium plate, an aluminum plate, a nickel plate, a copper plate, or the like can be exemplified. Usually, in order to facilitate the removal of an aluminum film from the substrate, it is preferable that the surface of the substrate is made as smooth as possible by mirror finishing, etc. However, the aluminum film formed on the surface of the substrate using the plating solution for aluminum electroplating prepared by the method of the present invention has a characteristic in that it can be easily removed even without subjecting the substrate to such processing (the reason thereof is not necessarily clear, but is presumably related to the fact that upon the formation of an aluminum film on a surface of a substrate, the concentrations of S and Cl derived from a plating solution increase near the surface of the aluminum film that is in contact with the substrate). Incidentally, as a material for the anode, aluminum can be exemplified, for example. The aluminum film may be removed from the substrate batchwise, or, alternatively, it is also possible to perform the formation and removal of the aluminum film continuously using a cathode drum (e.g., JP-A-6-93490).

Using the plating solution for aluminum electroplating prepared by the method of the present invention, even when the temperature of the plating solution is 80° C. or less, an aluminum foil having a thickness of 15 μm or less, which is currently very difficult to produce by rolling, and also an aluminum foil having a thickness of 10 μm or less, which, without exaggeration, is almost impossible to produce by rolling, can be produced by electrolysis. In addition, the plating solution prepared by the method of the present invention allows for an electroplating treatment with high aluminum deposition efficiency relative to the current flow, and is thus advantageous in that electricity usage can be reduced, resulting in excellent economic efficiency. Further, an aluminum foil obtained using the plating solution prepared by the method of the present invention is highly ductile and also has high purity. Specifically, using the plating solution prepared by the method of the present invention, for example, an aluminum foil having an aluminum content of 97.0 to 99.9 mass %, S and Cl contents of 1.5 mass % or less each (normally 0.01 to 0.5 mass %), and a thickness of 1 to 15 μm (a small amount of inevitable C or O from the air may also be contained) can be easily produced. The produced aluminum foil can be used, for example, as a thinned positive electrode current collector for achieving the miniaturization and higher energy density of an electrical storage device. Incidentally, the plating solution prepared by the method of the present invention can be used not only for the production of a high-ductility, high-purity aluminum foil at a high film formation rate, but also for aluminum coating for imparting aesthetic qualities and weather resistance to various kinds of articles. In addition, the plating solution prepared by the method of the present invention does not require the addition of an organic solvent, such as benzene or toluene, for increasing the film formation rate, and is thus advantageous in that it can be washed with water, and facilitates liquid waste disposal.

EXAMPLES

Hereinafter, the present invention will be described in detail with reference to the examples. However, the present invention should not be construed as being limited to the following descriptions.

Example 1

In a nitrogen gas atmosphere, dimethyl sulfone, anhydrous aluminum chloride, and trimethylamine hydrochloride were mixed in the six molar ratios shown in Table 1 and dissolved at 110° C. to prepare plating solutions for aluminum electroplating. The plating solutions were cooled by natural heat dissipation to room temperature (25° C.) and then allowed to stand for 24 hours, and the properties were visually observed. The results are shown in Table 1. Incidentally, with respect to "Relevance to Present Invention" in Table 1, with the number of moles of trimethylamine hydrochloride, which is a nitrogen-containing compound, being n, when the number of moles of anhydrous aluminum chloride is within a range of 3.5+n to 4.2+n, the plating solution is "Relevant", while when outside the range, it is "Non-relevant".

As is clear from Table 1, it was found that in the case where the plating solution contains trimethylamine hydrochloride, the melting point is not always lowered when the blending proportions of dimethyl sulfone and anhydrous aluminum chloride are such that the latter is 4 mol per 10 mol of the former in accordance with the description in Patent Document 3, and that when the blending proportion of trimethylamine hydrochloride relative to dimethyl sulfone is high, the solution solidifies at 25° C.

Using each of the plating solutions Nos. 1 to 4 given in Table 1, an electroplating treatment was performed for 15 minutes with stirring at an applied current density of 3 A/dm$^2$ while maintaining the plating solution at 30° C. Incidentally, an aluminum plate having a purity of 99.99% was used as an anode, and a copper plate was used as a cathode (a substrate for forming an aluminum film). After 15 minutes, the copper plate was removed from the plating solution, washed with water, and dried, and then the surface was visually observed. As a result, the surface of the copper plate had formed thereon a white aluminum film. In addition, also in the case where an electroplating treatment was performed for 5 minutes with stirring at an applied current density of 18 A/dm$^2$ while maintaining the plating solution at 100° C., the surface of the copper plate had formed thereon a white aluminum film. In any of the copper plates having the aluminum film formed on the surface thereof by the electroplating treatments, when forceps were inserted from the end portion between the aluminum film and the copper plate and moved to slide along the copper plate, the aluminum film was easily removed from the copper plate to give a white aluminum foil.

In addition, using each of the plating solutions Nos. 1 to 6 given in Table 1, an electroplating treatment was performed for 15 minutes with stirring at an applied current density of 3 A/dm$^2$ while maintaining the plating solution at 100° C., and the aluminum deposition efficiency (electrodeposition efficiency) relative to the current flow was calculated by the following equation. The results for the plating solution No. 1, the plating solution No. 2, the plating solution No. 3, and the plating solution No. 4, which are relevant to the plating solution of the present invention, were 87%, 94%, 95%, and 85%, respectively. That is, the electrodeposition efficiencies were all 85% or more. Meanwhile, the results for the plating solution No. 5 and the plating solution No. 6, which are not relevant to the plating solution of the present invention, were 83% and 79%, respectively. That is, the electrodeposition efficiencies were all less than 85%. Incidentally, with respect to the plating solutions Nos. 1 to 4 which are relevant to the plating solution of the present invention, also in the case where an electroplating treatment was performed while main-

TABLE 1

|  | Plating Solution No. | | | | | |
| --- | --- | --- | --- | --- | --- | --- |
|  | 1 | 2 | 3 | 4 | 5 | 6 |
| Dimethyl Sulfone (mol) | 10 | 10 | 10 | 10 | 10 | 10 |
| Anhydrous Aluminum Chloride (mol) | 4.0 | 4.0 | 4.0 | 4.0 | 4.0 | 4.0 |
| Trimethylamine Hydrochloride (mol) | 0.01 | 0.05 | 0.1 | 0.5 | 1 | 2 |
| Relevance to Present Invention | Relevant | Relevant | Relevant | Relevant | Non-relevant | Non-relevant |
| Property at 25° C. | Fluid | Fluid | Fluid | Fluid | Not fluid | Not fluid | taining the plating solution at 30° C., the electrodeposition efficiency values were the same.

Electrodeposition efficiency(%)=mass of aluminum deposited(g)/[current flow value(A)×current flow time(sec)×27÷3÷96500(C)]×100

(In the equation, the current flow value (A) is the product of the applied current density (A/dm$^2$) and the cathode surface area (dm$^2$), 27 is the atomic weight of aluminum, and 3 is the atomic value of aluminum.)

Example 2

In a nitrogen gas atmosphere, dimethyl sulfone, anhydrous aluminum chloride, and trimethylamine hydrochloride were mixed in the six molar ratios shown in Table 2 and dissolved at 110° C. to prepare plating solutions for aluminum electroplating. In addition, in a nitrogen gas atmosphere, dimethyl sulfone, anhydrous aluminum chloride, and tetramethylammonium chloride were mixed in the six molar ratios shown in Table 3 and dissolved at 110° C. to prepare plating solutions for aluminum electroplating. Further, in a nitrogen gas atmosphere, dimethyl sulfone, anhydrous aluminum chloride, and trimethylamine hydrochloride were mixed in the six molar ratios shown in Table 4 and dissolved at 110° C. to prepare plating solutions for aluminum electroplating. The plating solutions were cooled by natural heat dissipation to room temperature (25° C.) and then allowed to stand for 24 hours, and the properties were visually observed. The results are shown in Tables 2 to 4. Incidentally, with respect to "Relevance to Present Invention" in Tables 2 to 4, with the number of moles of trimethylamine hydrochloride or tetramethylammonium chloride, which is a nitrogen-containing compound, being n, when the number of moles of anhydrous aluminum chloride is within a range of 3.5+n to 4.2+n, the plating solution is "Relevant", while when outside the range, it is "Non-relevant".

TABLE 2

| | Plating Solution No. | | | | | |
|---|---|---|---|---|---|---|
| | 1 | 2 | 3 | 4 | 5 | 6 |
| Dimethyl Sulfone (mol) | 10 | 10 | 10 | 10 | 10 | 10 |
| Anhydrous Aluminum Chloride (mol) | 3.4 | 3.6 | 3.8 | 4.0 | 4.2 | 4.3 |
| Trimethylamine Hydrochloride (mol) | 0.01 | 0.01 | 0.01 | 0.01 | 0.01 | 0.01 |
| Relevance to Present Invention | Non-relevant | Relevant | Relevant | Relevant | Relevant | Non-relevant |
| Property at 25° C. | Not fluid | Fluid | Fluid | Fluid | Fluid | Not fluid |

TABLE 3

| | Plating Solution No. | | | | | |
|---|---|---|---|---|---|---|
| | 1 | 2 | 3 | 4 | 5 | 6 |
| Dimethyl Sulfone (mol) | 10 | 10 | 10 | 10 | 10 | 10 |
| Anhydrous Aluminum Chloride (mol) | 3.0 | 4.0 | 4.3 | 4.5 | 4.7 | 4.8 |
| Tetramethylammonium Chloride (mol) | 0.5 | 0.5 | 0.5 | 0.5 | 0.5 | 0.5 |
| Relevance to Present Invention | Non-relevant | Relevant | Relevant | Relevant | Relevant | Non-relevant |
| Property at 25° C. | Not fluid | Fluid | Fluid | Fluid | Fluid | Not fluid |

TABLE 4

| | Plating Solution No. | | | | | |
|---|---|---|---|---|---|---|
| | 1 | 2 | 3 | 4 | 5 | 6 |
| Dimethyl Sulfone (mol) | 10 | 10 | 10 | 10 | 10 | 10 |
| Anhydrous Aluminum Chloride (mol) | 5.4 | 5.6 | 5.8 | 6.0 | 6.2 | 6.4 |
| Trimethylamine Hydrochloride (mol) | 2 | 2 | 2 | 2 | 2 | 2 |
| Relevance to Present invention | Non-relevant | Relevant | Relevant | Relevant | Relevant | Non-relevant |
| Property at 25° C. | Not fluid | Fluid | Fluid | Fluid | Fluid | Not fluid |

As is clear from Tables 2 to 4, it was found that when the blending proportion of an aluminum halide is changed depending on the blending proportion of a nitrogen-containing compound relative to a dialkyl sulfone, a plating solution that does not solidify and is fluid even at 25° C. is obtained. Based on the above results, the blending proportions of a dialkyl sulfone, an aluminum halide, and a nitrogen-containing compound in the preparation of a plating solution were further studied. As a result, it was found that in the case where the aluminum halide and the nitrogen-containing compound are 3.5+n to 4.2+n mol and n mol (wherein n is 0.001 to 2.0 mol), respectively, per 10 mol of the dialkyl sulfone, the resulting plating solution has a low melting point, and it does not solidify and is fluid even at 25° C.

Using each of the plating solutions Nos. 2 to 5 given in Tables 2 to 4, an electroplating treatment was performed for 15 minutes with stirring at an applied current density of 3 A/dm$^2$ while maintaining the plating solution at 30° C. Incidentally, an aluminum plate having a purity of 99.99% was used as an anode, and a copper plate was used as a cathode (a substrate for forming an aluminum film). After 15 minutes, the copper plate was removed from the plating solution, washed with water, and dried, and then the surface was visually observed. As a result, the surface of the copper plate had formed thereon a white aluminum film. In addition, also in the case where an electroplating treatment was performed for 5 minutes with stirring at an applied current density of 18 A/dm$^2$ while maintaining the plating solution at 100° C., the surface of the copper plate had formed thereon a white aluminum film. In any of the copper plates having the aluminum film formed on the surface thereof by the electroplating treatments, when forceps were inserted from the end portion between the aluminum film and the copper plate and moved to slide along the copper plate, the aluminum film was easily removed from the copper plate to give a white aluminum foil.

In addition, with respect to each of the plating solutions Nos. 1 to 6 given in Table 2, the aluminum deposition efficiency (electrodeposition efficiency) relative to the current flow was calculated in the same manner as the method described in Example 1. The results for the plating solution No. 2, the plating solution No. 3, the plating solution No. 4, and the plating solution No. 5, which are relevant to the plating solution of the present invention, were 92%, 95%, 93%, and 93%, respectively. That is, the electrodeposition efficiencies were all 85% or more. Meanwhile, the results for the plating solution No. 1 and the plating solution No. 6, which are not relevant to the plating solution of the present invention, were 84% and 84%, respectively. That is, the electrodeposition efficiencies were all less than 85%. Also with respect to each of the plating solutions Nos. 1 to 6 given in Table 3 and Table 4, the aluminum deposition efficiency (electrodeposition efficiency) relative to the current flow was calculated in the same manner as the method described in Example 1. As a result, the electrodeposition efficiencies of the plating solutions Nos. 2 to 5, which are relevant to the plating solution of the present invention, were all 85% or more, while the electrodeposition efficiencies of the plating solutions Nos. 1 and 6, which are not relevant to the plating solution of the present invention, were all less than 85%.

Example 3

In a nitrogen gas atmosphere, dimethyl sulfone, anhydrous aluminum chloride, and trimethylamine hydrochloride were mixed in a molar ratio of 10:3.8:0.001 and dissolved at 110° C. to prepare a plating solution for aluminum electroplating. The plating solution was cooled by natural heat dissipation to room temperature (25° C.) and then allowed to stand for 24 hours, and the property was visually observed. As a result, the plating solution did not solidify and was fluid. Using this plating solution, an electroplating treatment was performed for 3 minutes with stirring at an applied current density of 50 A/dm$^2$ while maintaining the plating solution at 145° C. (anode: aluminum plate having purity of 99.99%, cathode: copper plate). As a result, a white aluminum film was formed on the surface of the copper plate. The aluminum deposition efficiency (electrodeposition efficiency) relative to the current flow in the electroplating treatment thus performed was calculated by the equation given in Example 1. The result was 99%. From the end portion of the copper plate having the aluminum film formed on the surface thereof, forceps were inserted between the aluminum film and the copper plate and moved to slide along the copper plate. As a result, the aluminum film was easily removed from the copper plate to give a white aluminum foil.

Example 4

In a nitrogen gas atmosphere, dimethyl sulfone, anhydrous aluminum chloride, and trimethylamine hydrochloride were mixed in a molar ratio of 10:3.8:0.1 and dissolved at 110° C. to prepare a plating solution for aluminum electroplating. The plating solution was cooled by natural heat dissipation to room temperature (25° C.) and then allowed to stand for 24 hours, and the property was visually observed. As a result, the plating solution did not solidify and was fluid. As a result of an electroplating treatment in the same manner as the method described in Example 3, a white aluminum film was formed on the surface of the copper plate. The aluminum deposition efficiency (electrodeposition efficiency) relative to the current flow in the electroplating treatment thus performed was calculated by the equation given in Example 1. The result was 90%. From the end portion of the copper plate having the aluminum film formed on the surface thereof, forceps were inserted between the aluminum film and the copper plate and moved to slide along the copper plate. As a result, the aluminum film was easily removed from the copper plate to give a white aluminum foil.

Example 5

In a nitrogen gas atmosphere, dimethyl sulfone, anhydrous aluminum chloride, and ammonium chloride were mixed in a molar ratio of 10:3.8:0.01 and dissolved at 110° C. to prepare a plating solution for aluminum electroplating. The plating solution was cooled by natural heat dissipation to room temperature (25° C.) and then allowed to stand for 24 hours, and the property was visually observed. As a result, the plating solution did not solidify and was fluid. Using this plating solution, an electroplating treatment was performed for 15 minutes with stirring at an applied current density of 7 A/dm$^2$ while maintaining the plating solution at 60° C. (anode: aluminum plate having purity of 99.99%, cathode: copper plate). As a result, a white aluminum film was formed on the surface of the copper plate. The aluminum deposition efficiency (electrodeposition efficiency) relative to the current flow in the electroplating treatment thus performed was calculated by the equation given in Example 1. The result was 89%. From the end portion of the copper plate having the aluminum film formed on the surface thereof, forceps were inserted between the aluminum film and the copper plate and moved to slide along the copper plate. As a result, the aluminum film was easily removed from the copper plate to give a white aluminum foil.

Example 6

In a nitrogen gas atmosphere, dimethyl sulfone, anhydrous aluminum chloride, and dimethylamine hydrochloride were mixed in a molar ratio of 10:3.8:0.01 and dissolved at 110° C. to prepare a plating solution for aluminum electroplating. The plating solution was cooled by natural heat dissipation to room temperature (25° C.) and then allowed to stand for 24 hours, and the property was visually observed. As a result, the plating solution did not solidify and was fluid. Using this plating solution, an electroplating treatment was performed in the same manner as the method described in Example 5. As a result, a white aluminum film was formed on the surface of the copper plate. The aluminum deposition efficiency (electrodeposition efficiency) relative to the current flow in the electroplating treatment thus performed was calculated by the equation given in Example 1. The result was 92%. From the end portion of the copper plate having the aluminum film formed on the surface thereof, forceps were inserted between the aluminum film and the copper plate and moved to slide along the copper plate. As a result, the aluminum film was easily removed from the copper plate to give a white aluminum foil.

Example 7

In a nitrogen gas atmosphere, dimethyl sulfone, anhydrous aluminum chloride, and tetramethylammonium chloride were mixed in a molar ratio of 10:3.8:0.01 and dissolved at 110° C. to prepare a plating solution for aluminum electroplating. The plating solution was cooled by natural heat dissipation to room temperature (25° C.) and then allowed to stand for 24 hours, and the property was visually observed. As a result, the plating solution did not solidify and was fluid. Using this plating solution, an electroplating treatment was performed in the same manner as the method described in Example 5. As a result, a white aluminum film was formed on the surface of the copper plate. The aluminum deposition efficiency (electrodeposition efficiency) relative to the current flow in the electroplating treatment thus performed was calculated by the equation given in Example 1. The result was 85%. From the end portion of the copper plate having the aluminum film formed on the surface thereof, forceps were inserted between the aluminum film and the copper plate and moved to slide along the copper plate. As a result, the aluminum film was easily removed from the copper plate to give a white aluminum foil.

Example 8

In a nitrogen gas atmosphere, dimethyl sulfone, anhydrous aluminum chloride, and phenanthroline were mixed in a molar ratio of 10:3.8:0.001 and dissolved at 110° C. to prepare a plating solution for aluminum electroplating. The plating solution was cooled by natural heat dissipation to room temperature (25° C.) and then allowed to stand for 24 hours, and the property was visually observed. As a result, the plating solution did not solidify and was fluid. Using this plating solution, an electroplating treatment was performed in the same manner as the method described in Example 5. As a result, a white aluminum film was formed on the surface of the copper plate. The aluminum deposition efficiency (electrodeposition efficiency) relative to the current flow in the electroplating treatment thus performed was calculated by the equation given in Example 1. The result was 90%. From the end portion of the copper plate having the aluminum film formed on the surface thereof, forceps were inserted between the aluminum film and the copper plate and moved to slide along the copper plate. As a result, the aluminum film was easily removed from the copper plate to give a white aluminum foil.

Example 9

Using the plating solution No. 4 given in Table 3, an electroplating treatment was performed for 15 minutes with stirring at an applied current density of 15 A/dm$^2$ while maintaining the plating solution at 90° C. (anode: aluminum plate having purity of 99.99%, cathode: copper plate). As a result, a white aluminum film was formed on the surface of the copper plate. The aluminum deposition efficiency (electrodeposition efficiency) relative to the current flow in the electroplating treatment thus performed was calculated by the equation given in Example 1. The result was 85%. From the end portion of the copper plate having the aluminum film formed on the surface thereof, forceps were inserted between the aluminum film and the copper plate and moved to slide along the copper plate. As a result, the aluminum film was easily removed from the copper plate to give a white aluminum foil.

Example 10

In a nitrogen gas atmosphere, dimethyl sulfone, anhydrous aluminum chloride, and tetramethylammonium chloride were mixed in a molar ratio of 10:5.8:2.0 and dissolved at 110° C. to prepare a plating solution for aluminum electroplating. The plating solution was cooled by natural heat dissipation to room temperature (25° C.) and then allowed to stand for 24 hours, and the property was visually observed. As a result, the plating solution did not solidify and was fluid. Using this plating solution, an electroplating treatment was performed for 15 minutes with stirring at an applied current density of 15 A/dm$^2$ while maintaining the plating solution at 115° C. (anode: aluminum plate having purity of 99.99%, cathode: copper plate). As a result, a white aluminum film was formed on the surface of the copper plate. The aluminum deposition efficiency (electrodeposition efficiency) relative to the current flow in the electroplating treatment thus performed was calculated by the equation given in Example 1. The result was 97%. From the end portion of the copper plate having the aluminum film formed on the surface thereof, forceps were inserted between the aluminum film and the copper plate and moved to slide along the copper plate. As a result, the aluminum film was easily removed from the copper plate to give a white aluminum foil.

Example 11

Using the plating solution No. 3 given in Table 2, an electroplating treatment was performed for 5 minutes with stirring at an applied current density of 18 A/dm$^2$ while maintaining the plating solution at 95° C. (anode: aluminum plate having purity of 99.99%, cathode: copper plate). As a result, a white aluminum film was formed on the surface of the copper plate. The aluminum deposition efficiency (electrodeposition efficiency) relative to the current flow in the electroplating treatment thus performed was calculated by the equation given in Example 1. The result was 98%. From the end portion of the copper plate having the aluminum film formed on the surface thereof, forceps were inserted between the aluminum film and the copper plate and moved to slide along the copper plate. As a result, the aluminum film was easily removed from the copper plate to give a white aluminum foil. The obtained aluminum foil was 5 μm thick, had high aluminum purity (aluminum content: 99.36 mass %, S content: 0.21 mass %, Cl content: 0.43 mass %), and was highly ductile like an aluminum foil produced by rolling. Incidentally, the thickness of the aluminum foil was measured using a micrometer (MCD191-30WD: manufactured by Niigata Seiki Co., Ltd.) (this also applies to the following examples). The purity of the aluminum foil was determined as follows. After washing both sides of the aluminum foil with water, the S content was measured using a sulfur analyzer (EMIA-820W: manufactured by Horiba, Ltd.), while the Cl content was measured using a wavelength-dispersive X-ray fluorescence spectrometer (RIX-2100: manufactured by Rigaku Corporation), and the remainder was taken as the aluminum content (this also applies to the following examples).

Example 12

Using the plating solution No. 3 given in Table 2, an electroplating treatment was performed for 3 minutes with stirring at an applied current density of 25 A/dm$^2$ while maintaining the plating solution at 115° C. Incidentally, an aluminum plate having a purity of 99.99% was used as an anode, and a titanium plate was used as a cathode (a substrate for forming an aluminum film). After 3 minutes, the titanium plate having an aluminum film formed on the surface thereof was removed from the plating solution, washed with water, and dried, and then the surface was visually observed. As a result, the surface of the titanium plate had formed thereon a white aluminum film. The aluminum deposition efficiency (electrodeposition efficiency) relative to the current flow in the electroplating treatment thus performed was calculated by the equation given in Example 1. The result was 92%. From the end portion of the titanium plate having the aluminum film formed on the surface thereof, forceps were inserted between the aluminum film and the titanium plate and moved to slide along the titanium plate. As a result, the aluminum film was easily removed from the titanium plate to give a white aluminum foil. This aluminum foil was subjected to a heat treatment in an argon atmosphere at 300° C. for 30 minutes to relax the internal stress of the foil. The obtained aluminum foil was 15 μm thick, had high aluminum purity (aluminum content: 99.91 mass %, S content: 0.03 mass %, Cl content: 0.06 mass %), and was highly ductile like an aluminum foil produced by rolling.

Example 13

In a nitrogen gas atmosphere, dimethyl sulfone, anhydrous aluminum chloride, and dimethylamine hydrochloride were mixed in a molar ratio of 10:4.1:0.15 and dissolved at 110° C. to prepare a plating solution for aluminum electroplating. The plating solution was cooled by natural heat dissipation to room temperature (25° C.) and then allowed to stand for 24 hours, and the property was visually observed. As a result, the plating solution did not solidify and was fluid. Using this plating solution, an electroplating treatment was performed for 5 minutes with stirring at an applied current density of 10 A/dm$^2$ while maintaining the plating solution at 80° C. in otherwise the same manner as the method described in Example 12 to give a white aluminum foil. The aluminum deposition efficiency (electrodeposition efficiency) relative to the current flow in the electroplating treatment thus performed was calculated by the equation given in Example 1. The result was 95%. This aluminum foil was subjected to a heat treatment in an argon atmosphere at 300° C. for 30 minutes to relax the internal stress of the foil. The obtained aluminum foil was 10 μm thick, had high aluminum purity (aluminum content: 99.56 mass %, S content: 0.15 mass %, Cl content: 0.29 mass %), and was highly ductile like an aluminum foil produced by rolling.

Application Example 1

Figure 1:
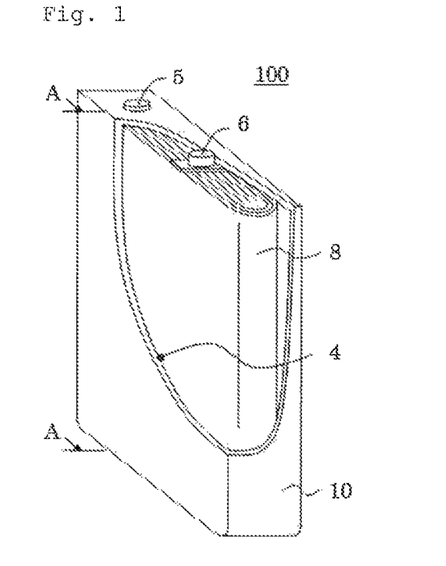
FIG. 1 is a schematic diagram of an example of an electrical storage device having an aluminum foil produced using a plating solution for aluminum electroplating prepared by the method of the present invention used as a positive electrode current collector for electrical storage devices.
Figure 2:
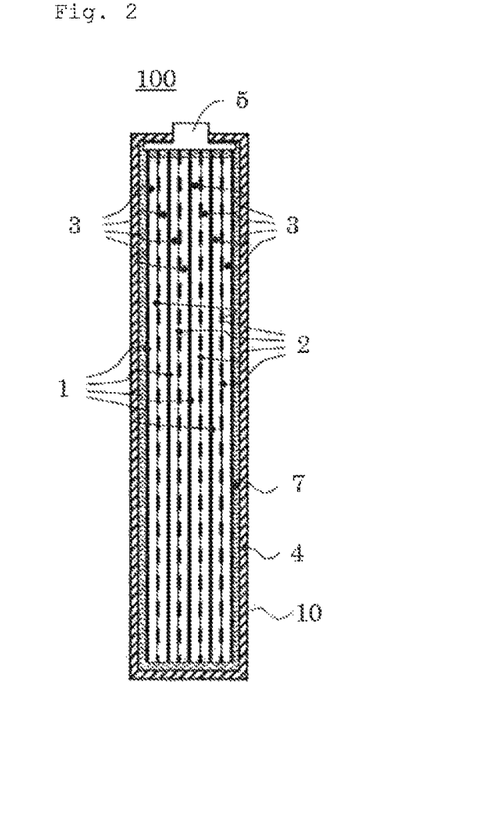
FIG. 2 shows an A-A cross-section of FIG. 1.

Fabrication of Electrical Storage Device Having Aluminum Foil Produced Using Plating Solution for Aluminum Electroplating Prepared by Method of Present Invention Used as Positive Electrode Current Collector for Electrical Storage Devices Using the aluminum foil obtained in Example 11 as a positive electrode current collector, a positive electrode active material was applied to the surface thereof, and the positive electrode thus obtained was used to fabricate the electrical storage device shown in FIG. 1. The electrical storage device 100 has a casing 10, which is filled with an organic electrolytic solution containing a fluorine compound, and an electrode unit 8, which is immersed in the organic electrolytic solution. The electrode unit 8 has a positive electrode, a negative electrode, and a separator, which are strip-shaped thin foils, and are stacked in the order of positive electrode/separator/negative electrode/separator into a laminate and wound. The casing 10 is made of a metal material and has an insulating layer 4 formed inside thereof. In addition, the casing 10 has a positive terminal 5 and a negative terminal 6, which serve as connection terminals to an external device. The positive terminal 5 and the negative terminal 6 are electrically connected to the positive electrode of the electrode unit 8 and the negative electrode of the electrode unit 8, respectively. FIG. 2 shows an A-A cross-section of FIG. 1. The positive electrode 1 and the negative electrode 2 are physically isolated from each other by the separator 3 and thus are not in direct electrical communication with each other. However, the separator 3 is made of a porous material which the organic electrolytic solution 7 can pass through, and the positive electrode 1 and the negative electrode 2 are electrically connected via the organic electrolytic solution 7.

INDUSTRIAL APPLICABILITY

The present invention makes it possible to provide a method for preparing a plating solution for aluminum electroplating useful for the production of a high-ductility, high-purity aluminum foil at a high film formation rate, etc., which is an easy-to-handle plating solution that does not solidify and allows for an electroplating treatment even at 25° C.; a plating solution for aluminum electroplating prepared by the method; a method for producing an aluminum foil using the plating solution for aluminum electroplating; and a method for lowering a melting point of a plating solution for aluminum electroplating. In this respect, the present invention is industrially applicable.

EXPLANATION OF REFERENCE NUMERALS

1 Positive electrode
2 Negative electrode
3 Separator
4 Insulating layer

5 Positive terminal
6 Negative terminal
7 Organic electrolytic solution
8 Electrode unit
10 Casing
100 Electrical storage device

The invention claimed is:

1. A method for aluminum electroplating, comprising the steps of:
preparing a plating solution for aluminum electroplating containing at least (1) a dialkyl sulfone, (2) an aluminum halide, and (3) a nitrogen-containing compound, characterized in that the blending proportions of the dialkyl sulfone, the aluminum halide, and the nitrogen-containing compound in a preparation of a plating solution are such that per 10 mol of the dialkyl sulfone, the aluminum halide is 3.5+n to 4.2+n mol, and the nitrogen-containing compound is n mol (wherein n is 0.001 to 2.0 mol), and
conducting an electroplating treatment with the plating solution at a temperature of 25 to less than 80° C.

2. The method for aluminum electroplating according to claim 1, characterized in that the dialkyl sulfone is dimethyl sulfone.

3. The method for aluminum electroplating according to claim 1, characterized in that the nitrogen-containing compound is at least one selected from the group consisting of an ammonium halide, a hydrogen halide salt of a primary amine, a hydrogen halide salt of a secondary amine, a hydrogen halide salt of a tertiary amine, a quaternary ammonium salt represented by the general formula: $R^1R^2R^3R^4N.X$ ($R^1$ to $R^4$ independently represent an alkyl group and are the same as or different from one another, and X represents a counteranion for the quaternary ammonium cation), and a nitrogen-containing aromatic compound.

4. A method for producing an aluminum foil, comprising the steps of:
forming an aluminum film on a surface of a substrate by electrolysis using the aluminum electroplating method of claim 1, and then
removing the film from the substrate.

5. The method of claim 1, wherein the electroplating treatment is conducted with the plating solution at a temperature of 25° C.

6. The method of claim 1, wherein the electroplating treatment is conducted with the plating solution at a temperature of 30° C.

* * * * *